Figure 1:
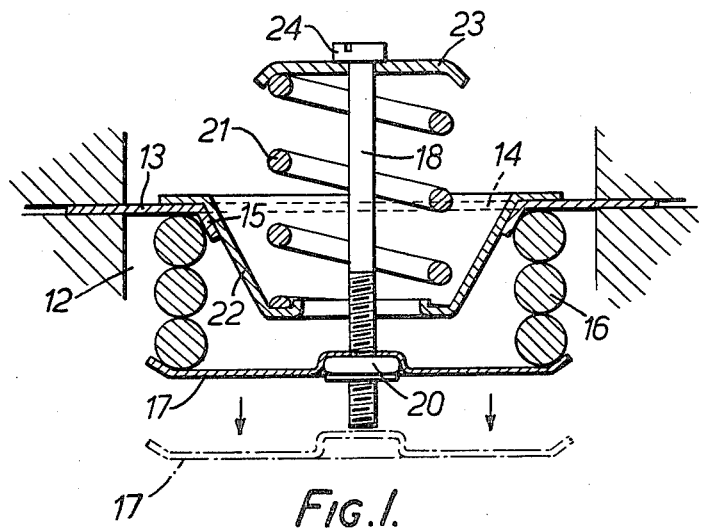

United States Patent [19]

Hart et al.

[11] 4,227,646
[45] Oct. 14, 1980

[54] TEMPERATURE-RESPONSIVE VALVE

[75] Inventors: William B. Hart, Ipswich; Reginald T. Williams, Hadleigh, both of England

[73] Assignee: Delta Materials Research Limited, Ipswich, England

[21] Appl. No.: 964,934

[22] Filed: Nov. 30, 1978

[51] Int. Cl.³ .............................................. G05D 23/02
[52] U.S. Cl. ............................... 236/93 R; 236/101 D; 251/DIG. 3
[58] Field of Search ............ 236/93 R, 101 C, 101 D; 251/DIG. 3; 73/363.9

[56] References Cited

U.S. PATENT DOCUMENTS

| | | | |
|---|---|---|---|
| 1,608,205 | 11/1926 | Francke | 236/93 R |
| 2,362,232 | 11/1944 | Anshicks | 251/DIG. 3 |
| 2,371,900 | 3/1945 | Livermont | 251/DIG. 3 |
| 3,011,512 | 12/1961 | Moen | 251/DIG. 3 |
| 3,219,272 | 11/1965 | Korte | 236/93 R |
| 3,664,582 | 5/1972 | Jackson et al. | 236/93 R |
| 3,715,894 | 2/1973 | Widdowson | 236/101 D X |
| 3,976,280 | 8/1976 | Alexander et al. | 251/DIG. 3 |

Primary Examiner—Albert J. Makay
Assistant Examiner—William E. Tapolcai, Jr.
Attorney, Agent, or Firm—Wigman & Cohen

[57] ABSTRACT

A valve which opens and closes according to the temperature of the fluid passing through it has a fluid-controlling valve member consisting of a helix of a shape memory effect material having an elastic modulus which varies significantly with temperature in a reversible manner. At relatively low fluid temperature, the turns of the helix are closely compacted and obstruct the flow, while at relatively high fluid temperature, the turns are expanded and allow flow of fluid between them.

12 Claims, 4 Drawing Figures

TEMPERATURE-RESPONSIVE VALVE

This invention relates to temperature-responsive valve capable of controlling the flow of a fluid through a passage or duct according to the temperature of the fluid. Such valves are well known and are used in numerous applications; thus, the water-cooling system of motor vehicles usually employ a thermostatic water valve controlled by a wax element to allow flow of the coolant only when the temperature of the coolant exceeds a given value.

Known temperature responsive valves have temperature detectors which operate valve members according to the detected temperature. The detector may incorporate a liquid which effects the required operating action by expansion, a solid which in changing state to a liquid expands or contracts, or a bimetallic element. It has further been proposed in U.S. Pat. No. 3,664,582 issued on 23rd May 1972, to W. F. Jackson et al and in U.K. Pat. No. 1308107 of Veneinigte Flugtechnische Werke-Fokker GmbH, published Feb. 28, 1973 to use as the temperature detector an element made of a nickel titanium alloy and having a temperature actuated shape memory.

As will be perceived from a consideration of the above numbered patents temperature-responsive valves as known previously are relatively complicated and bulky and do not lend themselves easily to applications where available space is limited. The designs of valve actuator using shape memory alloys as described in those patents are particularly in appropriate for use in thermostatic valves for cooling systems.

One object of the present invention is to combine together in a temperature-responsive valve the functions of temperature-detection and fluid flow control.

Another object is to provide a valve member which is itself made of temperature-responsive material and which therefore requires no separate actuating mechanism.

A temperature-responsive valve according to the present invention comprises (a) means constituting a passage for the flow of fluid; and (b) a valve member mounted relative to said passage to control the flow of fluid, (c) said valve member comprising a helically wound spring having a plurality of turns and made of a shape memory effect material having an elastic modulus which varies significantly with temperature in a reversible manner over a transition temperature range, (d) the spacing of adjacent turns of said spring varying with temperature in said range whereby the flow of fluid between said turns is controlled.

The shape memory effect material has a transition temperature range which is dependent on the composition of the material which is therefore so chosen that the valve opens and closes at required temperatures while it is possible to employ many shape memory effect materials for the valve member, including the nickel-titanium alloy referred to in the above mentioned patents, it is preferred to use a copper-zinc-aluminium alloy.

When a copper-zinc-aluminium alloy is used, its composition by weight is approximately:
copper: 70%
zinc: 26%
aluminium: 4%
the actual proportions by weight varying slightly from those figures according to the operating temperature required.

Figure 2:
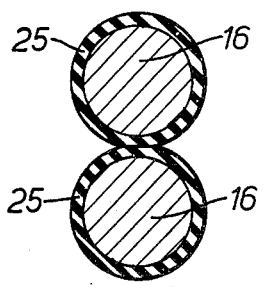
Figure 3:
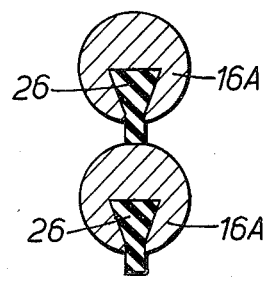
Figure 4:
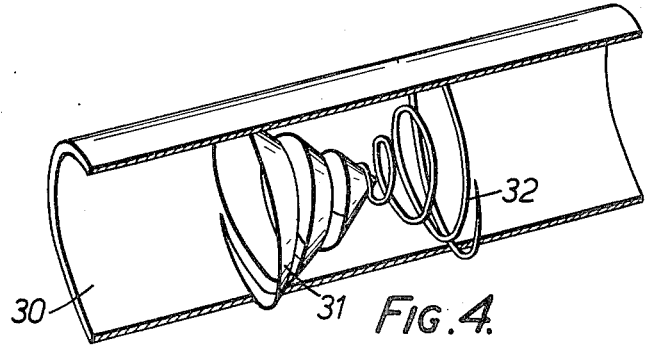

The invention will be more readily understood by way of example from the following description of temperature responsive valves in accordance therewith, reference being made to the accompanying drawings, in which FIG. 1 is an axial section through one form of valve useful as a thermostatic water valve for a vehicle cooling system, FIGS. 2 and 3 show modifications of the valve of FIG. 1, and FIG. 4 is a cut-away perspective view of a second form of valve.

In FIG. 1, a passage is shown at 12 for the flow of a fluid to be thermally controlled. The passage 12 is for example located in the radiator of a motor vehicle. Sealed in the wall of the passage 12 is a plate 13 having a wide central opening 14 surrounded by a down-turned lip 15.

A valve member in the form of a helically wound compression spring 16 abuts against the underside of plate 14 and engages the lip 15. The lower end of spring 16 acts against a disc 17 carried by a central spindle 18 which passes upwardly through the spring 16 and the opening 14. The disc 17 is retained on the spindle by an adjustment nut 20 threaded on the end of the spindle. A steel biasing compression spring 21 acts between a fixed abutment formed by the lower end of a frusto-conical shell 22 seated on the inner edge of the plate 13, and a further disc 23 which engages against the enlarged head 24 of the spindle 18. Bias spring 21 biases spring 16 towards the fully compressed condition shown in the drawing.

The compression spring 16 is made of shape memory effect alloy having an elastic modulus which varies significantly with temperature in a reversible manner over a transition temperature range. Such an alloy is well known, the alloy preferred for use in the present invention having a composition by weight of the order of:
copper: 70%
zinc: 26%
aluminium: 4%,
the actual proportions of the constituents differing in minor respects from those figures according to the temperature requirements. However other suitable alloys may be used instead.

The alloy is heat-treated to bring it into a condition in which it exhibits a martensitic transformation when subject to temperature change in the transition range. The characteristic displayed by the alloy is a progressive increase in stiffness of the spring 16 as the temperature rises through the range. At or below the lower end of that range, the stiffness is low and bias spring 21, which does not show a significant change in elastic modulus with temperature, urges spring 16 into the condition shown where the turns of the spring are forced into engagement with one another. As the temperature of spring 16 increases, the stiffness also increases with the result that the turns of the spring are progressively spaced apart.

When the temperature of the fluid in passage 12 is at or below the low end of the transition temperature range, the valve is effectively shut, since flow is blocked by the spring 16 and the disc 17. As the temperature rises through the range, the valve progressively opens, flow of fluid taking place through the spacing of adjacent turns of the spring 16. Similarly, a reversal of temperature change of the fluid through the transition range results in the valve progressively closing.

The shape memory effect spring 16 has two functions simultaneously. Firstly, it acts as a sensor of the temperature of the fluid in the passage 12. Secondly, it acts as the valve member, controlling the rate of flow of the fluid through the passage. As a result, the valve is self-contained, being compactly located entirely within the passage 12.

The temperature at which the valve opens and closes can be adjusted by turning the spindle 18 in nut 20, so as to alter the length of the spindle between disc 23 and nut 20. The consequence is to vary the biasing force applied by spring 21 to the spring 16 at any temperature and hence to change the temperature at which the valve closes.

In order to increase the effectiveness of the valve of FIG. 1, the rod or wire forming the shape memory effect spring 16 may be encased in a coating 25 of elastomeric material as shown in FIG. 2, for example by dipping the spring in a solution of the rubber or other material. FIG. 2 shows parts of two adjacent turns of the spring and illustrates the sealing effect. Alternatively, as demonstrated in FIG. 3, the rod or wire of the shape memory effect spring 16A may incorporate a projecting strip 26 of elastomeric material; the strip extends the length of the helical spring and, when the spring is compressed, seals together adjacent turns of the spring. Strip 26 may be a rubber extrusion captured in an extrusion of the shape memory effect alloy forming the spring.

FIG. 4 shows a modified form of the valve. In that figure, the passage through which the fluid can flow is shown at 30, the valve member at 31 and the biasing spring at 32. The valve member is similar to the spring 16 of FIG. 1 in its composition and properties, but differs from it in being conically helical. The final turn of the spring is sealed to the wall of the passage so that, when the spring is axially compressed to bring the turns into contact with one another, the spring closes the passage.

Bias spring 32, which is also secured in the wall of the passage applies an axial force to the spring 31 in a direction tending to compress the latter into the shut condition. The operation of the valve is thus similar to that described in relation to FIG. 1. At low temperature of the fluid, spring 31 has low stiffness and is compressed by bias spring 32 to shut the valve. As the temperature rises, spring 31 expands to the position shown and the fluid is allowed to pass through the spacings between its turns.

We claim:

1. A temperature-responsive valve comprising:
   (a) means for constituting a passage for the flow of fluid;
   (b) a valve member mounted relative to said passage to control the flow of fluid;
   (c) said valve member including a helically wound spring having a plurality of turns and being made of a shape memory effect material having an elastic modulus which varies significantly with temperature in a reversible manner over a transition temperature range;
   (d) wherein the spacing of adjacent turns of said helically wound spring varies with temperature in said range whereby the flow of fluid between said turns is controlled;
   (e) said turns being in engagement with one another at one temperature and being opened to allow flow of fluid therethrough as the temperature changes from said one temperature; and
   (f) wherein said valve member further includes a biasing compression spring and a spindle operatively connecting said biasing compression spring and said helically wound spring via a pair of spaced discs carried by said spindle.

2. The temperature-responsive valve as claimed in claim 1, further including means, associated with said spindle, for controlling the degree of engagement of said turns.

3. The temperature-responsive valve as claimed in claim 1, in which said helically wound spring is wound as a cylindrical helix and a plate closes the end turn, whereby fluid flow can take place only between said turns.

4. A temperature-responsive fluid valve comprising:
   (a) a body including a passage for the flow of fluid;
   (b) a valve member mounted in said passage for directly controlling the fluid flow therethrough as a function of the fluid temperature, said valve member including a helical spring having a plurality of turns, the spacing of adjacent turns being varied automatically with temperature to control the passage of fluid through said turns, said helical spring being formed of a shape memory effect material having an elastic modulus which varies with temperature; and
   (c) adjusting means, operatively connected to said helical spring, for controlling the temperature at which said spring turns open and close;
   wherein said adjusting means includes a biasing spring means for acting on said helical spring and an adjustable shaft means for carrying both said biasing spring means and said helical spring.

5. The temperature-responsive valve as claimed in claim 4, in which said biasing spring means biases said helical spring towards a shut position in which said plurality of turns are in engagement.

6. The temperature-responsive valve as claimed in claim 4, in which said helical spring is encased in elastomeric material.

7. The temperature-responsive valve as claimed in claim 4, in which said helical spring incorporates a projecting strip means, made of elastomeric material, for sealing the spacing between adjacent turns when the helical spring is compressed.

8. The temperature-responsive valve as claimed in claim 4, wherein said shape memory effect material is a copper-zinc-aluminum alloy.

9. The temperature-responsive valve as claimed in claim 8, wherein said copper-zinc-aluminum alloy consists of, by weight, about 70% copper, about 26% zinc, and about 4% aluminum.

10. The temperature-responsive valve as claimed in claim 8, wherein said copper-zinc-aluminum alloy is heat treated to yield a martensitic structure.

11. The temperature-responsive fluid valve as claimed in claim 4, wherein said adjustable shaft means is rotatable in order to vary the degree of acting by said biasing spring means.

12. A temperature-responsive valve comprising:
   (a) means constituting a passage for the flow of fluid;
   (b) a valve member mounted relative to said passage to control the flow of fluid;

(c) said valve member including a helically wound spring having a plurality of turns and being made of a shape memory effect material having an elastic modulus which varies significantly with temperature in a reversible manner over a transition temperature range;
(d) wherein the spacing of adjacent turns of said helically wound spring varies with temperature in said range whereby the flow of fluid between said turns is controlled; and
(e) resilient spring means for biasing said helically wound spring, said resilient spring means being wound as a conical or frusto-conical helix in direct contact with said helically wound spring.

* * * * *